United States Patent [19]

Long

[11] Patent Number: 4,781,074
[45] Date of Patent: Nov. 1, 1988

[54] SHIFTER

[76] Inventor: Leonard C. Long, R.D. #2, Box 718A, Annville, Pa. 17003

[21] Appl. No.: 37,842

[22] Filed: Apr. 13, 1987

[51] Int. Cl.⁴ ............................................. G05G 9/12
[52] U.S. Cl. ................................... 74/476; 74/473 R
[58] Field of Search ............................ 74/473 R, 476

[56] References Cited

U.S. PATENT DOCUMENTS

| | | | |
|---|---|---|---|
| 3,052,135 | 9/1962 | Hurst, Jr. et al. | 74/473 R |
| 3,172,301 | 3/1965 | Hurst, Jr. et al. | 74/473 R |
| 3,274,842 | 9/1966 | Huff | 74/473 R X |
| 3,323,387 | 6/1967 | Hurst, Jr. et al. | 74/476 |
| 3,541,879 | 11/1970 | Ravenel | 74/477 |
| 3,774,469 | 11/1973 | Bruhn, Jr. | 74/476 |
| 4,567,785 | 2/1986 | Reynolds et al. | 74/476 X |

Primary Examiner—Allan D. Herrmann
Attorney, Agent, or Firm—F. Brice Faller

[57] ABSTRACT

Five-speed shifter for an automotive transmission comprises an outer housing, an inner housing pivotable in the outer housing about a first axis, and a shift lever pivotable in said inner housing about a second axis which extends transversely of the first axis. The shift lever has a spring loaded extension which engages a selected one of three shift rails in the outer housing by pivoting about the second axis. A gear is then engaged by pivoting about the first axis to slide the selected rail forward or backward. A pin on the shift lever cooperates with a multilevel slot in a sidewall of the outer housing to preclude shifting into reverse unless the lever is depressed. In an externally mounted embodiment, each rail has a finger extending through a floor of the outer housing. The fingers are pivotably connected to coupling rods which effect rotation of shift control shafts which extend from the gear housing.

20 Claims, 3 Drawing Sheets

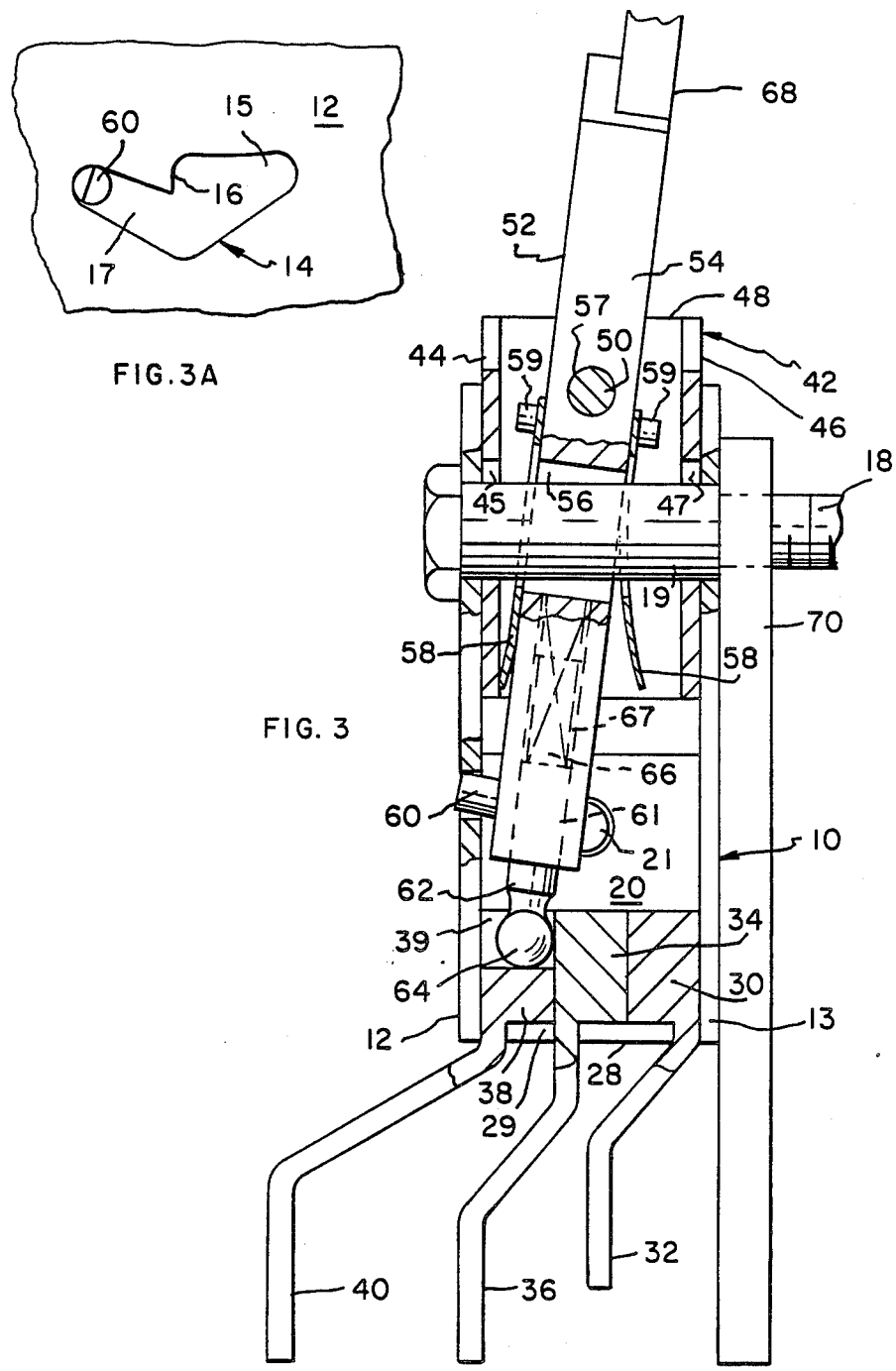

SHIFTER

BACKGROUND OF THE INVENTION

The present invention relates to a shifting mechanism for an automotive transmission, and particularly to an externally mounted standard pattern shifter with a reverse lockout.

Some transmissions have shift control shafts extending from a side of the gear housing and radially extending arms fixed to the shafts. The arms are pivotally connected to coupling rods extending toward a shifting mechanism mounted remotely on the transmission. The coupling rods at this end are pivotally connected to fingers extending downward from a shifter of the type to be discussed.

External mount gear shifters are well known; U.S. Pat. Nos. 3,052,135, 3,172,301 and 3,323,387 to G. H. Hurst, Jr. et al are representative of such shifters for conventional shift patterns. Known external mount shifters generally employ fingers pivoted within a housing and a shift lever likewise pivoted in the housing. The lever may have a lower extension which directly engages a finger when moved laterally, or may act on fingers indirectly through various arrangements of pins and springs. One of the most popular external mount shifters is the Hurst shifter having a mechanism of the type shown in U.S. Pat. No. 3,323,387. It employs a selector pin carried on the lower end of a shift lever pivotable about two axes. The fingers are side by side in the housing and have holes which are aligned when the transmission is in neutral. The selector pin has an engaging head within the holes and acts upon the fingers with which it is aligned by appropriate lateral movement of the shifter. In practice, the fingers are not flush in the housing and tend to separate further after prolonged use. At the same time, the engaging head on the pin eventually wears until it can slip between the fingers.

U.S. Pat. No. 3,323,387 discloses a four speed shifter with reverse offset and parallel to one arm of the H. Reverse is engaged by bearing on the shifter so that it urges the selector pin to a lower level before the hole in the finger controlling reverse can be engaged. There is no five speed embodiment disclosed, and likewise there is no means suggested for locking out reverse in a five speed transmission.

SUMMARY OF THE INVENTION

The shifter of the present invention is a standard pattern shifter for external mounting on a transmission. It utilizes side by side shift rails in an outer housing with a shift lever pivoted about two axes thereabove. Fingers for pivotal connection to the control rods are fixed to respective rails and extend downward of the housing. The shift lever may be operated at two levels by virtue of oval holes in an inner housing which carries the shift lever. A first shaft fixed to the outer housing passes through these holes and a further oval hole in the shift lever, which is journaled on a second shaft fixed in the inner housing above the first shaft and at a right angle thereto. The lever has a spring loaded extension with a spherical distal end which engages a notch in a respective shift rail determined by pivoting the lever about the second shaft. A gear is then engaged by pivoting about the first shaft. This causes a rail to slide in the outer housing, which in turn moves a coupling rod and rotates a shift control shaft. The spring loaded extension serves to hold the transmission in the gear selected.

An important feature of this construction is that a reverse lockout means may be readily provided on a five speed transmission. A pin is provided on a portion of the shift lever below the inner housing and a slot in the sidewall of the outer housing which flanks the rail for fifth gear and reverse. The slot is profiled to receive the pin readily when fifth gear is engaged, but the shift lever must be pushed to a lower level in order for the pin to enter the portion of the slot corresponding to reverse. The extension is received in the lever against the action of the spring to accommodate this downward movement. A conscious effort is thus required to overcome the spring action before reverse can be engaged.

For a transmission having internal lockouts preventing simultaneous engagement of two gears, the rails may be mounted to slide directly against each other. For transmissions without this feature, stationary barriers may be provided between the rails to preclude the extension bearing on two rails at once.

Note that while external mount shifters having rails were not heretofore known, transmissions having a shift lever pivoted in the housing and acting directly on rails in the transmission are well known. See, for example U.S. Pat. Nos. 3,541,879 to Ravenel and 4,567,785 to Reynolds et al. However, these patents do not disclose two level shifting with reverse lockout means, or a spring loaded extension.

It is the chief object of the present invention to provide a highly reliable, smooth acting, conventional pattern shifter for external mounting. The inventive shifter is especially suitable for road racing use, where thousands of shifts may be necessary under grueling conditions in a single race.

It will be apparent that the principles of the invention may also be applied to a shifter mounted in the transmission housing and having an extension which engages shift rails inside the transmission.

BRIEF DESCRIPTION OF THE DRAWING

FIG. 3 is an end section view when reverse is engaged;

FIG. 3A shows the lockout configuration when reverse is engaged;

DETAILED DESCRIPTION OF THE PREFERRED EMBODIMENT

Figure 1:
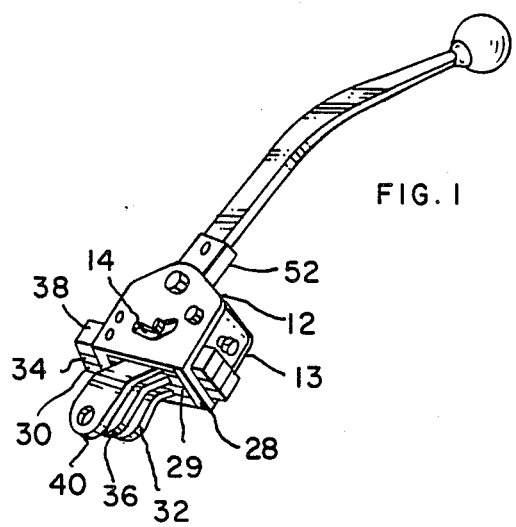
FIG. 1 is a perspective of the shifter.
Figure 1A:
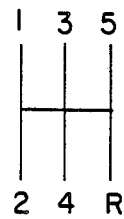
FIG. 1A shows a conventional five speed shift pattern.

FIG. 1 is a perspective view of a shifter according to the present invention for a five speed transmission with a shift pattern as shown in FIG. 1A. The shifter includes an outer housing 10 comprising two parallel outer sidewalls 12,13 connected by a floor 28 having an opening 29 therein. Shift rails 30,34,38 are slidably mounted in the housing and have respective fingers 32,36,40 fixed thereto which extend through opening 29. To mount the mechanism to a transmission, it is fixed to an adaptor plate 70 (FIGS. 2 and 3) which in turn is mounted to the extension housing of a transmission. The control rod for first and second gear is pivotably connected to finger 32, the control rod for third and fourth gear is pivotably connected to finger 36, and the control rod for fifth gear is pivotably connected to finger 40. U.S. Pat. No. 3,172,301 to Hurst et al is illustrative of well known pivotable connecting means. Shift lever 52 provides for gear selection and engagement. The slot 14 in outer sidewall 12 is part of a reverse lockout feature to be described.

Figures 2, 2A:
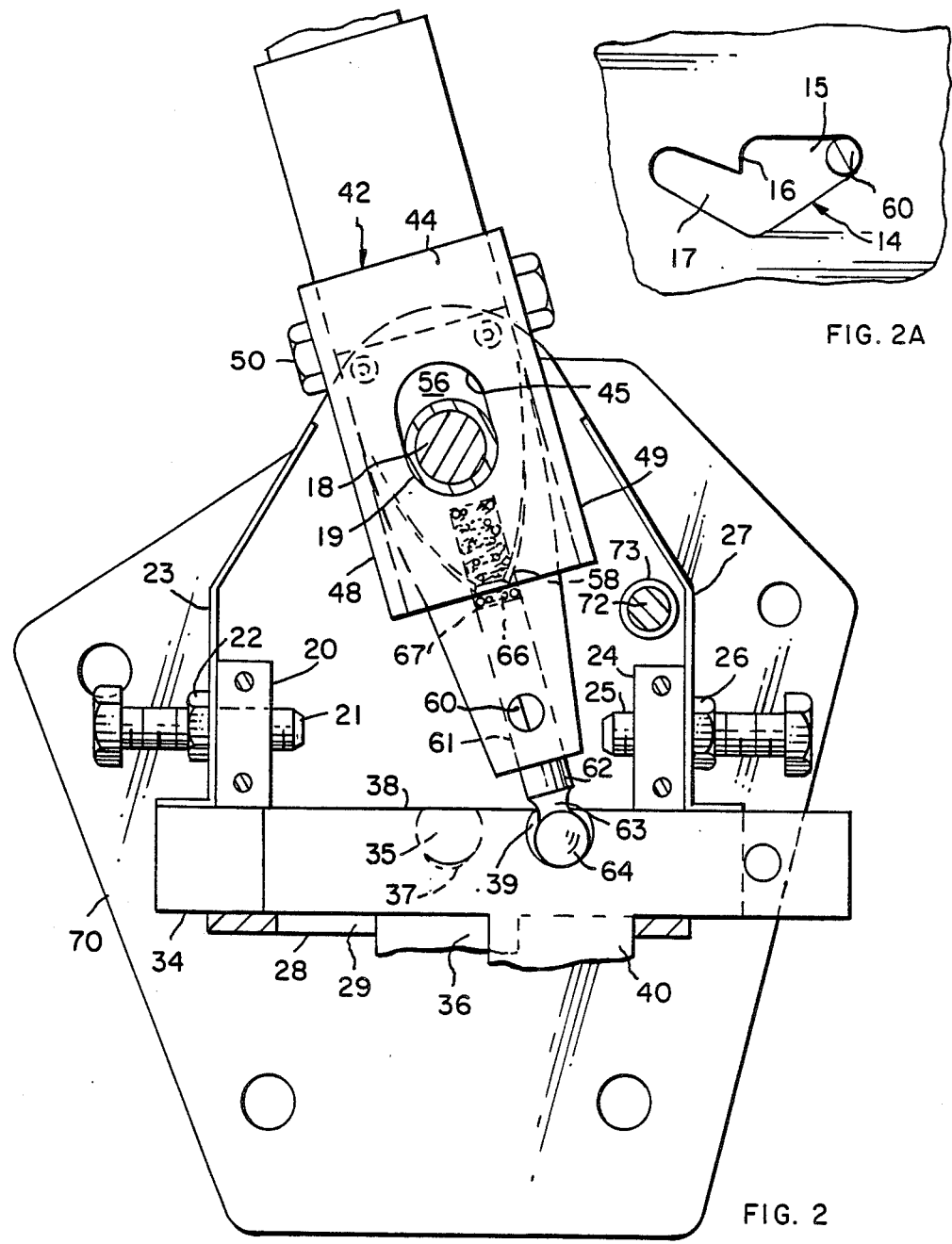
FIG. 2 is a side section view when fifth gear is engaged.
FIG. 2A shows the lockout configuration when fifth gear is engaged.

FIG. 2 is a side section view taken along a plane between outer sidewall 12 (FIGS. 1, 3) and shift rail 38, and shows the shifter when fifth gear is engaged. Referring also to FIG. 3, the shifter comprises an inner housing 42 of substantially square cross section having parallel inner sidewalls 44,46 connected by parallel inner endwalls 48,49. The inner housing 42 is received in the outer housing 10 with inner sidewalls 44,46 substantially flush with outer sidewalls 12,13. The shift lever 52 comprises a shank portion 54 received through the inner housing 42, which is open toward and away from the floor 28. The shank portion 54 has an oval hole 56 therethrough which aligns with oval holes 45,47 in respective inner sidewalls 44,46. A bolt 18 and a sleeve 19 between the outer sidewalls 12,13 provide first shaft means received through oval holes 45,47,56 so that the inner housing 42 can pivot in the outer housing 10 in response to forward and rearward motion of the shift lever 52. The bolt 18 also serves to secure the outer housing to the adaptor plate 70. A bolt 50 received through the inner endwalls 48,49 passes closely through a bore 57 in the shank portion and serves as a second shaft means so that the shift lever 52 can pivot in the inner housing 42. Note that the shank portion 54 is spaced from the inner sidewalls 44,46 and carries leaf springs 58 which urge it toward a central position. Leaf springs 58 are fixed to opposite sides of shank 54 by respective screws 59.

Referring still to FIG. 2 and 3, outer endwalls 20,24 are bolted in place between sidewalls 12,13 and serve several purposes: they stabilize the outer sidewalls; they maintain the shift rails 30,34,38 against the floor 28; and they are tapped to receive adjustable stopbolts 21,25 which limit forward and rearward travel of the shifter. The locknuts 22,26 which hold the bolts 21,25 in place also serve to hold sheet metal covers 23,27 in place on the ends of the housing 10. A bolt 72 through outer sidewalls 12,13 and a spacer 73 therebetween serves to further secure the outer housing to the adaptor plate 70.

Each of the shift rails 30,34,38 has a respective shift notch 31,35,39. When the shifter is in neutral, these notches align to form a single channel. The shift lever has an extension 62 received in a bore 61 against concentric inner and outer coil springs 66,67 which load the distal end 64 of the extension into the channel. Note that the distal end 64 is spherical and is separated from the cylindrical shank of the extension 62 by a neck 63. The notches 31,35,39 are formed as bores intersecting the top surface of the rails, the axes of the bores being colinear when the shifter is in neutral. Since the bores are of only slightly larger diameter than the spherical distal end 64 and partially enclosed at the top, the likelihood of the end 64 escaping is precluded and a smooth shift action is obtained. The notch 35 in the shift rail 34, which is the central shift rail controlling third and fourth gears, is provided with a detent 37 which receives the distal end 64 when the shift lever 52 is centered by leaf springs 58.

The reverse lockout feature comprises a pin 60 which is received in slot 14 in the outer sidewall 12 when the shifter is in either fifth gear or reverse, as shown in FIGS. 2 and 3 respectively. The slot 14 comprises an upper track 15, a lower track 17, and a step 16 therebetween. When the shifter is in any of first through fifth gears, the springs 66,67 load the inner housing 42 and shank portion 54 against the bottom of sleeve 19 where the bolt 18 and sleeve 19 pass through oval holes 45,47,56. When the shifter is in fifth gear, the pin 60 is in upper track 15 as shown in FIG. 2A. If the driver attempts to shift directly from fifth gear to reverse (FIG. 1A), the pin will hit step 16 so that the transmission remains in neutral.

In order to engage reverse, the handle 68 must first be moved rightward so that the distal end 64 moves leftward to notch 39 in rail 38, and the pin 60 is in the center of slot 14. The handle is then depressed so that springs 66,67 are compressed as extension 62 rides up bore 61 and the inner housing 42 and shank portion 54 bear against the top of sleeve 19. The pin 60 thus clears the step 16 and can then move to the position of FIG. 3A as reverse gear is engaged. Note that shifting from any gear to neutral requires some compressing of springs 66,67, so that these springs also serve to retain the shifter in the engaged gear until the handle 68 is moved by the driver.

In operation, the shifter is moved conventionally by the driver, depression of the handle being required only to engage reverse. When moving the shifter so that the central shift rail 34 is engaged, as from second to third gear, little lateral pressure need be applied by the driver since the leaf springs 58 serve to center the shifter. The spherical shape of the distal end 64 is also helpful when changing rails since it need only be over the center line between rails before it can begin moving the rail of the next gear forward or backward in response to respective backward or forward movement of the shift handle 68.

Figure 4C:
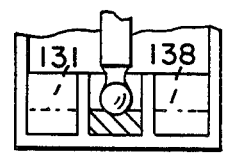
FIG. 4C is an end section view of the alternative embodiment in fourth.
Figure 4A:
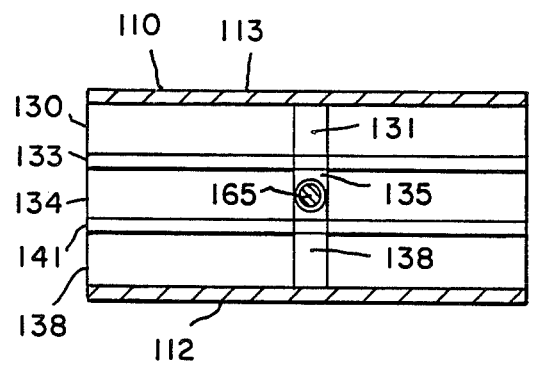
FIG. 4A is a top section view of an alternative embodiment in neutral.
Figure 4B:
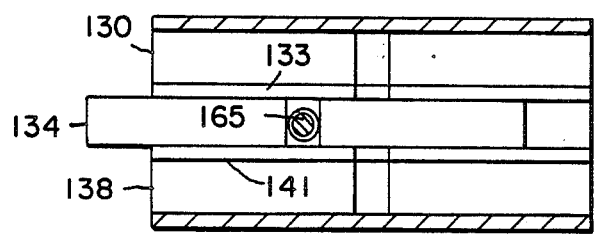
FIG. 4B is a top section view of the alternative embodiment in fourth.

The above described embodiment is suitable for transmissions having internal lockouts which preclude engaging two gears at once. In other words, it would not be possible to simultaneously move two rails from the neutral position. In transmissions which do not have such internal lockouts the principles of the invention may be applied in a shifter similar to that described above, but with a modified outer housing 110 as shown in FIGS. 4A, 4B and 4C. Here the outer sidewalls 112, 113 correspond to sidewalls 12,13 and so forth, the difference being the partition 133 between rails 130,134 and the partition 141 between rails 134,138. The partitions 133,141 are fixed to the floor 128 and are provided with notches to form a continuous channel with notches 131,135,138 when the transmission is in neutral (FIG. 4A). FIG. 4B and 4C depict the outer housing and rails when fourth gear is engaged. The presence of the partitions 133,141 prevents moving the shifter unless the distal end 165 is wholly within a notch, whereby it is not possible to move the end 164 against two rails simultaneously.

The shifter of either embodiment is manufactured primarily of steel. The outer housing comprises pieces of plate stock welded together and the inner housing is a piece of square tubing in which holes are machined, while the shifter shank is machined from bar stock. The shift rails are likewise machined from bar stock, while the shift fingers are machined from plate, formed, and welded thereto. Details of construction should be readily apparent to one skilled in the art.

The foregoing is exemplary and not intended to limit the scope of the claims which follow.

I claim:

1. A shift control mechanism for an automotive transmission comprising an outer housing, at least two parallel shift rails arranged for sliding mvoement, each rail having a shift notch, said notches being aligned to form a single channel when the transmission is in neutral, a shift lever pivotable in said housing, said shift lever having an extension extending toward said shift rails and spring loaded there against, said extension having a distal end received in said channel.

2. A shift control mechanism as in claim 1 wherein said shift lever is movable toward said rails to increase the loading of the extension thereagainst.

3. A shift control mechanism as in claim 2 wherein said lever has fixed therein a pin which extends toward said housing, said housing having a sidewall with a slot therein which receives said pin when said distal end of said extension is in the notch of the shift rail adjacent said sidewall, said slot having upper and lower tracks, said pin lying in said upper track when said shift rail slides in one direction from neutral, said pin lying in said lower track when said shift rail slides in the opposite direction, it being necessary to move said shift lever toward said rails before the pin can engage the lower track.

4. A shift control mechanism as in claim 3 wherein said shift control mechanism is for a transmission having five forward speeds and reverse, said rail controlling fifth gear and reverse lying adjacent said outer sidewall, said pin engaging said upper track when said transmission is in fifth gear, said pin engaging said lower track when said transmission is in reverse, whereby it is not possible to move from fifth gear to reverse without bearing down on the shift lever.

5. A shift control mechanism for external mounting on the housing of an automotive transmission, said transmission having at least two shift control shafts extending therefrom, eah control shaft having a shift arm fixed radially thereto for pivotal connection to a coupling rod, said mechanism comprising an outer housing having two parallel outer sidewalls first shaft means fixed between said outer sidewalls substantially perpendicular thereto, at least two parallel shift rails between said sidewalls, said shift rails being arranged for sliding movement parallel to said sidewalls, each shift rail having a finger fixed thereto and extending from said housing, each rail having a shift notch opposite said finger, said notches being aligned to form a single channel when the transmission is in neutral, an inner housing comprising two parallel inner sidewalls and two inner endwalls extending therebetween, said inner housing being received in said outer housing with said inner sidewalls facing said outer sidewalls substantially flushly, said inner housing being open toward and away from said shift rails, said inner sidewalls having a pair of respective first holes which receive said first shaft means therethrough, said inner housing being pivotable relative to said outer housing about said first shaft means, second shaft means fixed between said inner endwalls substantially parallel to said sidewalls, shift lever means extending through said inner housing, said shift lever means having a first hole receiving said first shaft means therethrough and a second hole receiving said second shaft means therethrough, said shift lever means being pivotable relative to said inner housing about said second shaft means, said shift lever means being spaced from said inner sidewalls, said shift lever means having an extension extending toward said rails and spring loaded thereagainst, said extension having a distal end received in said channel, whereby, upon fixing said mechanism to a transmission with a control rod pivotably connected to a shift arm at one end and to a respective finger at the other end, a gear may be selected by pivoting said lever means about said first and second shaft means.

6. A shift control mechanism as in claim 5 wherein said shift lever means comprises a shift lever having bore means therein facing said rails, said bore means having coil spring means therein, said extension being received in said bore means against said spring means, whereby said distal end is spring loaded in said channel.

7. A shift control mechanism as in claim 6 wherein said first hole in said shift lever means is in said shift lever, said first holes in said inner housing and said shift lever being oval and elongated toward said rails so that said inner housing and said lever are movable within said outer housing toward and away from said rails, said inner housing being loaded away from said rails by said coil spring means.

8. A shift control mechanism as in claim 7 wherein said shift lever extends beyond said inner housing toward said rails, said lever having fixed therein a pin which extends toward one of said sidewalls of said outer housing, said one of said sidewalls having therein a slot which receives said pin when said distal end of said extension is in the notch of the shift rail adjacent said sidewall, said slot having upper and lower tracks, said pin lying in said upper track when said shift rail slides in one direction from neutral, said pin lying in said lower track when said shift rail slides in the opposite direction from neutral, it being necessary to move said shift lever toward said rails before the pin can engage the lower track.

9. A shift control mechanism as in claim 8 wherein said shift control mechanism is for a transmission having five forward speeds and reverse, said rail controlling fifth gear and reverse lying adjacent said outer sidewall, said pin engaging said upper track when said transmission is in fifth gear, said pin engaging said lower track when said transmission is in reverse, whereby it is not possible to move from fifth gear to reverse without bearing down on the shift lever.

10. A shift control mechanism as in claim 5 wherein said shift lever means comprises a shift lever centered in said inner housing by spring means between said shift lever and the adjacent inner sidewalls.

11. A shift control mechanism as in claim 2 wherein said spring means comprises a pair of leaf springs fixed to said lever and loaded against respective inner sidewalls.

12. A shift control mechanism as in claim 5 wherein said outer housing further comprises two opposed outer endwalls extending between said outer sidewalls, at least one of said endwalls having stop means therein for limiting the movement of said shift lever means when pivoting about said first shaft means.

13. A shift control mechanism as in claim 5 wherein said outer housing further comprises a partition between each adjacent pair of rails, each said partition having a notch therein, each notch aligning with said notches in said rails to form a continuous channel when said transmission is in neutral, said partitions preventing said distal end from bearing against two rails at once, whereby said partitions prevent engaging two gears at once.

14. A shift control mechanism as in claim 5 wherein the notches in the rails are formed as bores intersecting the top surface of the rails, the axes of the bores being colinear when the shifter is in neutral.

15. A shift control mechanism as in claim 5 wherein said rails move rectilinearly when said shift lever means is pivoted about said first shaft means, said distal end of said extension likewise moving rectilinearly.

16. A shift control mechanism for an automotive transmission, said mechanism comprising outer housing means having two parallel outer sidewalls, first shaft means fixed between said outer sidewalls substantially perpendicular thereto, at least two parallel shift rails below said first shaft means, said shift rails being arranged for sliding movement parallel to said sidewalls, each rail having a shift notch facing said first shaft means, said notches being aligned to form a single channel when the transmission is in neutral, an inner housing comprising two parallel inner sidewalls and two inner endwalls extending therebetween, said inner housing being received in said outer housing with said inner sidewalls facing said outer sidewalls substantially flushly, said inner housing being open toward and away from said shift rails, said inner sidewalls having a pair of respective first holes which receive said first shaft means therethrough, said inner housing being pivotable about said first shaft means, second shaft means fixed between said inner endwalls substantially parallel to said sidewalls, shift lever means extending through said inner housing, said shift lever means having a first hole receiving said first shaft means therethrough and a second hole receiving said second shaft means therethrough, said shift lever means being pivotable relative to said inner housing about said second shaft means, said shift lever means being spaced from said inner sidewalls, said shift lever means having an extension extending toward said shift rails and spring loaded thereagainst, said extension having a distal end received in said channel, said lever means further comprising a handle extending away from said rails.

17. A shift control mechanism as in claim 16 wherein said shift lever means comprises a shift lever having bore means therein facing said rails, said bore means having coil spring means therein, said extension being received in said bore means against said spring means, whereby said distal end is spring loaded in said channel.

18. A shift control mechanism as in claim 17 wherein said first hole in said shift lever means is in said shift lever, said first holes in said inner housing and said shift lever being oval and elongated toward said rails so that said inner housing and said lever are movable within said outer housing means toward and away from said rails, said inner housing being loaded away from said rails by said coil spring means.

19. A shift control mechanism as in claim 18 wherein said shift lever extends beyond said inner housing toward said rails, said lever having fixed therein a pin which extends toward one of said sidewalls of said outer housing means, said one of said sidewalls having therein a slot which receives said pin when said distal end of said extension is in the notch of the shift rail adjacent said sidewall, said slot having upper and lower tracks, said pin lying in said upper track when said shift rail slides in one direction from neutral, said pin lying in said lower track when said shift rail slides in the opposite direction from neutral, it being necessary to move said shift lever toward said rails before the pin can engage the lower track.

20. A shift control mechanism as in claim 19 wherein said shift control mechanism is for a transmission having five forward speeds and reverse, said rail controlling fifth gear and reverse lying adjacent said outer sidewall, said pin engaging said upper track when said transmission is in fifth gear, said pin engaging said lower track when said transmission is in reverse, whereby it is not possible to move from fifth gear to reverse without bearing down on the shift lever.

* * * * *